(12) United States Patent
Cappeller et al.

(10) Patent No.: US 9,874,281 B2
(45) Date of Patent: Jan. 23, 2018

(54) GAS CYLINDER ACTUATOR WITH OVERTRAVEL SAFETY DEVICE

(71) Applicant: SPECIAL SPRINGS S.R.L., Romano d'Ezzelino (IT)

(72) Inventors: Augusto Cappeller, Bassano del Grappa (IT); Alessandro Cappeller, Tezze sul Brenta (IT); Dante Cappeller, Cartigliano (IT)

(73) Assignee: SPECIAL SPRINGS S.R.L., Romano d'Ezzelino (IT)

( * ) Notice: Subject to any disclaimer, the term of this patent is extended or adjusted under 35 U.S.C. 154(b) by 0 days.

(21) Appl. No.: 15/057,268

(22) Filed: Mar. 1, 2016

(65) Prior Publication Data

US 2016/0178056 A1    Jun. 23, 2016

Related U.S. Application Data

(62) Division of application No. 13/781,937, filed on Mar. 1, 2013, now Pat. No. 9,291,265.

(30) Foreign Application Priority Data

Mar. 1, 2012   (IT) .............................. PD2012A0057
Jun. 18, 2012  (IT) .............................. PD2012A0194

(51) Int. Cl.
*F01B 11/02*    (2006.01)
*F16J 10/02*    (2006.01)
(Continued)

(52) U.S. Cl.
CPC ............. *F16J 10/02* (2013.01); *F16F 9/0218* (2013.01); *F16F 9/3242* (2013.01); *F16F 9/36* (2013.01);
(Continued)

(58) Field of Classification Search
CPC ... F15B 15/1428; F16F 9/0218; F16F 9/0236; F16F 9/0281; F16F 9/435; F16F 2230/24
See application file for complete search history.

(56) References Cited

U.S. PATENT DOCUMENTS 3,168,853 A    2/1965  Prince
3,598,021 A    8/1971  Langland et al.
(Continued)

FOREIGN PATENT DOCUMENTS

CN    201155501 Y    11/2008
CN    102348907 A    2/2012
(Continued)

OTHER PUBLICATIONS

Chinese Office Action from corresponding Chinese Application No. 201310064963.3 dated Dec. 4, 2015.
(Continued)

*Primary Examiner* — Michael Leslie
(74) *Attorney, Agent, or Firm* — Lando & Anastasi, LLP

(57) ABSTRACT

A gas cylinder actuator with overtravel safety device, comprising a tubular jacket for gas containment, which is closed hermetically at one end by a bottom provided with a gas filling valve and at the opposite end by a head portion, which is provided with a hole for the passage of a stem with a piston, the jacket, the bottom and the piston forming the gas expansion and compression chamber.
The head portion comprises an annular body, which is fixed internally to the jacket, and is provided with a central hole for the passage of the stem with the interposition of dynamic sealing elements, static sealing elements being interposed between the annular body and the jacket and an element for controlling the descending motion of a slider of a press with which the actuator is associated being provided and protruding from the annular body or from the jacket, the control element being preset to selectively move or break or deform
(Continued)

in order to break or deform or render ineffective in general the static and dynamic sealing elements.

3 Claims, 10 Drawing Sheets

(51) Int. Cl.
*F16F 9/32* (2006.01)
*F16F 9/43* (2006.01)
*F16J 10/00* (2006.01)
*F16F 9/36* (2006.01)
*F16F 9/02* (2006.01)

(52) U.S. Cl.
CPC ............... *F16F 9/435* (2013.01); *F16J 10/00* (2013.01); *F16F 2230/24* (2013.01)

(56) References Cited

U.S. PATENT DOCUMENTS

| | | | |
|---|---|---|---|
| 4,685,384 A | 8/1987 | Dirkin et al. | |
| 5,465,811 A | 11/1995 | Katz | |
| 5,651,303 A | 7/1997 | Fish | |
| 5,680,808 A | 10/1997 | Day et al. | |
| 6,431,332 B1 | 8/2002 | Phelizot | |
| 6,520,065 B2 | 2/2003 | Sakurai et al. | |
| 6,796,159 B2 | 9/2004 | Kelm | |
| 6,997,102 B2 | 2/2006 | Fischass | |
| 7,607,383 B2 | 10/2009 | Nagel | |
| 8,776,964 B2 * | 7/2014 | Cappeller | ........... F15B 15/1428 188/286 |
| 9,157,500 B2 * | 10/2015 | Cappeller | ............. F16F 9/0218 |
| 9,291,265 B2 * | 3/2016 | Cappeller | ............. F16F 9/0218 |
| 2011/0303084 A1 * | 12/2011 | Cappeller | ........... F15B 15/1428 92/169.1 |

FOREIGN PATENT DOCUMENTS

| | | |
|---|---|---|
| EP | 0 959 263 A1 | 11/1999 |
| EP | 2177783 A2 | 4/2010 |
| FR | 2 779 194 A1 | 12/1999 |
| JP | H0972311 A | 3/1997 |
| WO | 2009/063003 A1 | 5/2009 |

OTHER PUBLICATIONS

European Examination Report from corresponding European Application No. 13156821.4 dated Oct. 1, 2015.
Italian Search Report and Written Opinion from corresponding IT PD20120057 dated Nov. 26, 2012.

* cited by examiner

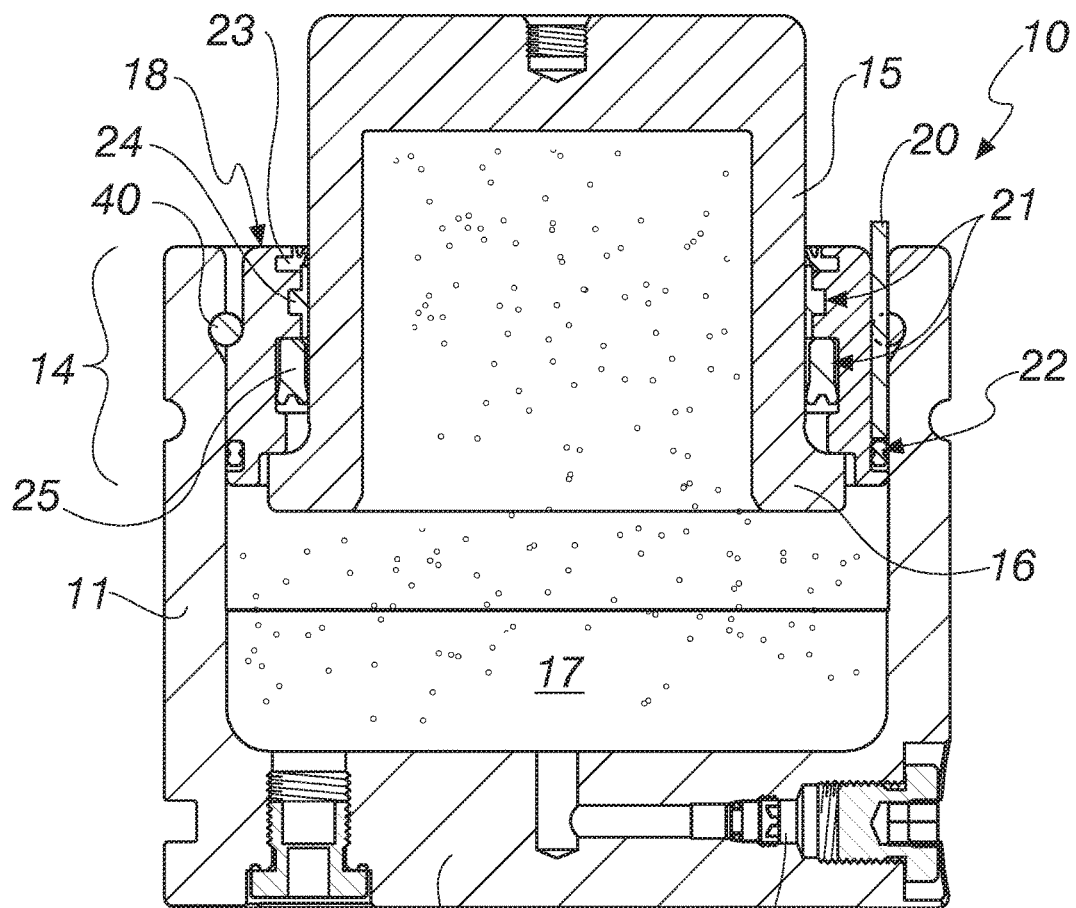
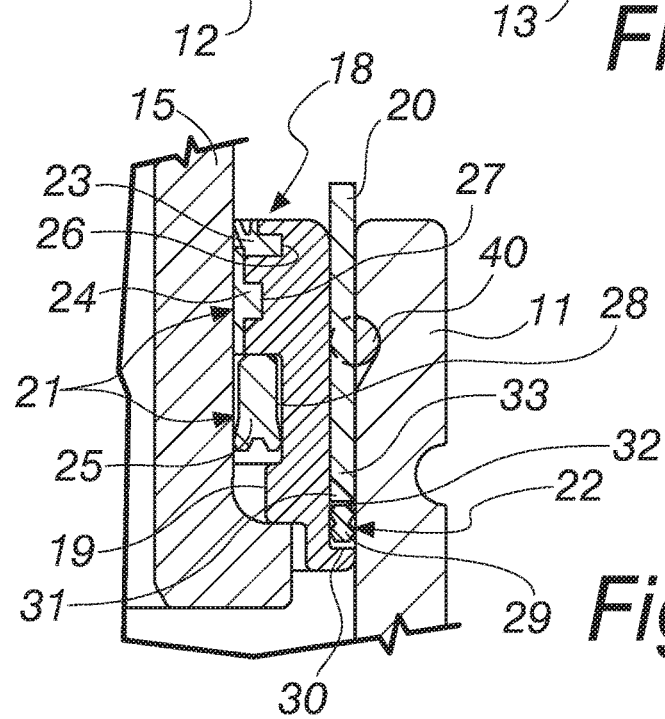

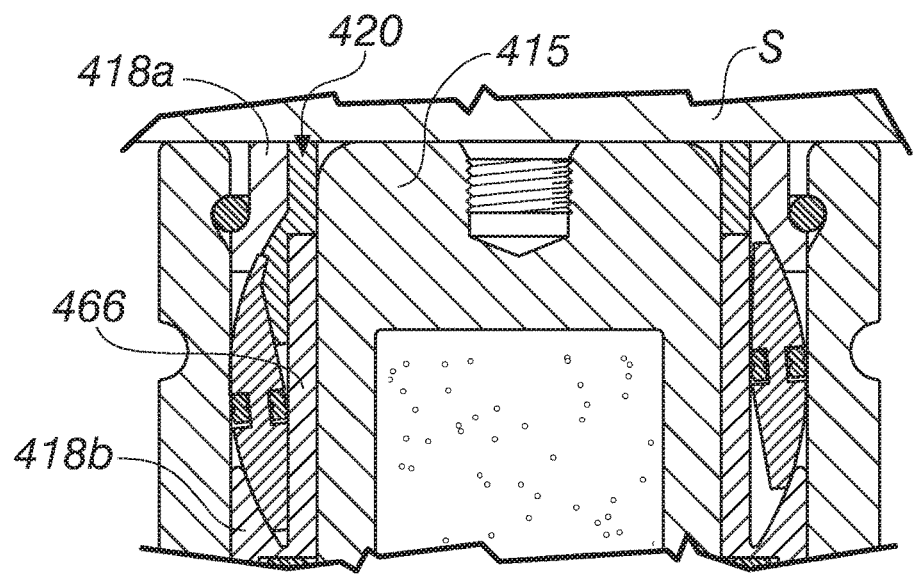
Fig. 15
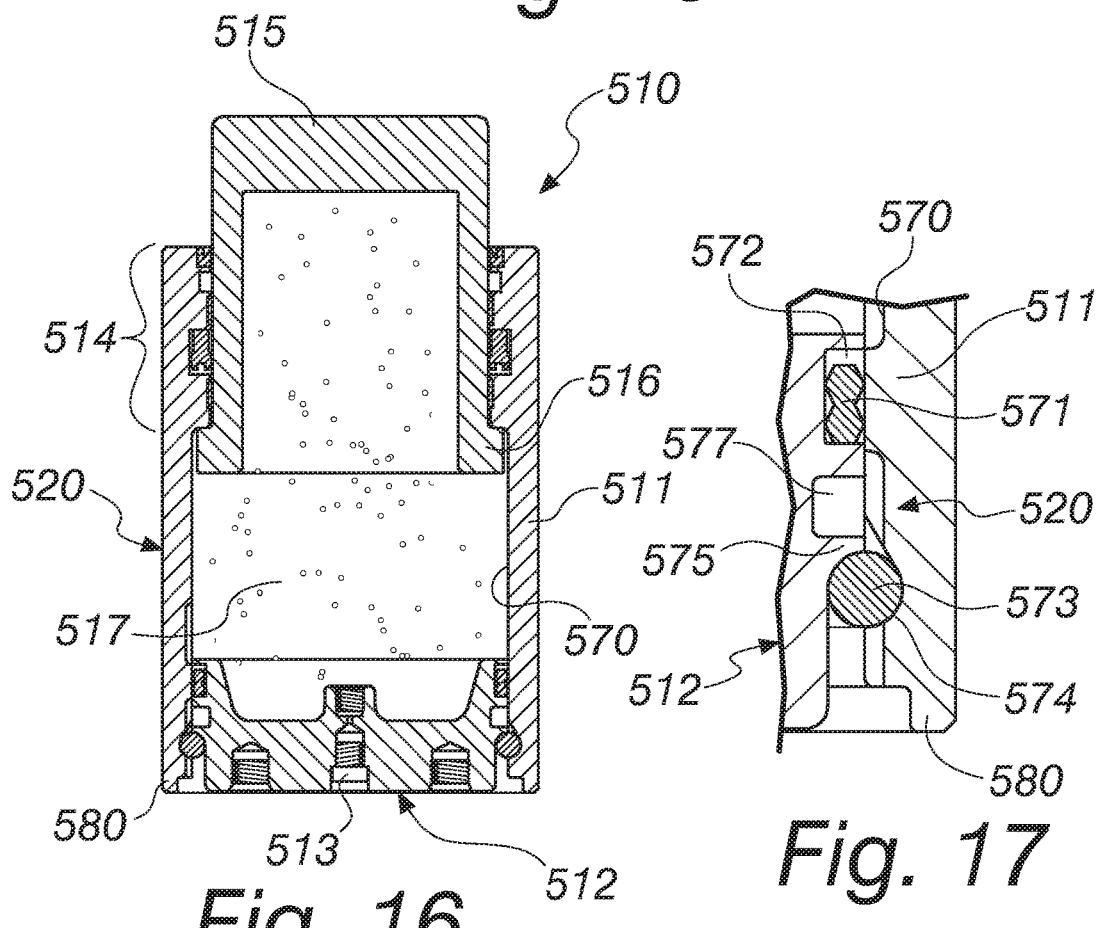
Fig. 16
Fig. 17

GAS CYLINDER ACTUATOR WITH OVERTRAVEL SAFETY DEVICE

RELATED APPLICATIONS

This application is a divisional of pending U.S. patent application Ser. No. 13/781,937, filed Mar. 1, 2013, entitled GAS CYLINDER ACTUATOR WITH OVERTRAVEL SAFETY DEVICE, which claims the benefit under 35 U.S.C. § 119 of Italian Patent Application No. PD2012A000057 filed on Mar. 1, 2012 and Italian Patent Application No. PD2012A000194 filed on Jun. 18, 2012. These prior applications are incorporated by reference herein in their entirety.

BACKGROUND OF THE INVENTION

The present invention relates to a gas cylinder actuator with overtravel safety device.

Gas cylinder actuators generally are formed by a tubular jacket for gas containment that is closed hermetically at one end by a bottom provided with a gas filling valve and, at the opposite end, by a head portion that is provided with a hole for the passage of a stem with a piston, which translates inside said jacket; the jacket, the bottom and the head portion form the stroke compartment for the piston, while said piston, with the jacket and the bottom, forms the chamber for the compression and expansion of the gas.

These gas cylinder actuators are typically but not exclusively used for devices such as dies, molding presses and the like, in which they can be subjected to situations of high internal pressure or of impact with the associated parts of a press or of a die, such that they can be damaged; this damage can cause said gas cylinder actuator to become unusable, requiring replacement and stopping of the machine or system in which it is placed to work, but it can also be such as to harm an operator who is in the vicinity, as in the case of an explosion due to an uncontrolled pressure increase.

One of the reasons that mainly lead to such damage is what is called the overtravel of the piston, i.e., a retracting stroke of the stem with the piston that is longer than allowed from the constructive point of view for that specific gas cylinder actuator.

This overtravel can be caused for example by an unexpected increase in load on the stem of the actuator, which forces said stem to retract into the body of the actuator over an unexpected length, causing an internal overload of the actuator that can be unsustainable for the structure of the actuator as a whole.

The actuator can thus splay or break in the connecting points between the parts that compose it, or its sealing elements can fail, and in all these cases an unexpected, unwanted and dangerous rapid escape of gas can occur.

To prevent the occurrence of these dangerous overtravel situations, gas cylinder actuators have been devised which comprise safety devices designed for the controlled and safe escape of the pressurized gas in case of overtravel.

For example, granted European patent EP0959263B 1 in the name of Orflam Industries, with priority dated May 22, 1998, discloses and claims a device with a compressible fluid that comprises a compression chamber that contains compressible fluid, and a piston that can be moved within said compression chamber in a first direction to compress said compressible fluid and in a second direction, which is opposite to the first one, in response to a force of the compressed fluid, the device comprising a safety element arranged so as to be struck by the piston if it performs an accidental travel that exceeds a preset nominal travel, said safety element being preset to cause the discharge of the compression chamber when struck by the piston.

A safety device for gas cylinder actuators is described and claimed in Italian patent application PD 2007 A 378 dated Nov. 13, 2007, in the name of the same Applicant as of the present application, Special Springs s.r.l.

This safety device is characterized in that it comprises, associated with the bottom or with the jacket of a gas cylinder actuator, a breakable partition that is subjected to the pressure produced by the compressed gas inside a compression and expansion chamber of a gas cylinder actuator, said breakable partition being associated with a longitudinally extending element that extends in said compression and expansion chamber over such a length as to affect part of said piston during its descent, before it performs a travel that exceeds the predefined travel (i.e., an overtravel); the longitudinally extending element is supported by flexible support means that are adapted to allow it, in the presence of a preset thrust of the piston on said longitudinally extending element, to move so as to break said breakable partition, opening an outward exit path for the gas.

Both cited safety systems for gas cylinder actuators, despite being effective, have drawbacks.

A first drawback is linked to the fact that both technical solutions provide for the breakage of a part that is designed to allow the controlled escape of pressurized gas.

Therefore, in order to restore the full functionality of said gas cylinder actuator the part needs to be replaced, consequently requiring labor as well as spare parts.

A further drawback resides in the fact that the provision of said parts preset for breaking must be extremely precise, since it is essential that these parts break exactly at the preset stress.

Otherwise, if the parts preset for breaking do not break in the presence of the design loads, or break with loads lower than the design values, the gas cylinder actuator would not be safe.

Moreover, in the cited known gas cylinder actuators, the parts designed to break in the case of overtravel are arranged inside the gas cylinder actuator and therefore any breakage thereof is not immediately visually detectable.

SUMMARY OF THE INVENTION

The aim of the present invention is to provide a gas cylinder actuator with overtravel safety device that is capable of obviating the drawbacks revealed by gas cylinder actuators and safety devices of the known type.

Within this aim, an object of the invention is to provide a gas cylinder actuator with overtravel safety device that is very simple to reset if overtravel occurs.

Another object of the invention is to provide a gas cylinder actuator in which the activation of the safety device is easily visible even from the outside of said gas cylinder actuator.

Another object of the invention is to provide a gas cylinder actuator with safety device that is not less efficient and safe than known gas cylinder actuators.

Another object of the invention is to propose a gas cylinder actuator with overtravel safety device that is structurally simple and easy to use and can be manufactured with known systems and technologies and at low costs.

This aim, as well as these and other objects that will become more apparent hereinafter, are achieved by a gas cylinder actuator with overtravel safety device, comprising a tubular jacket for gas containment, which is closed hermetically at one end by a bottom provided with a gas filling valve and at the opposite end by a head portion, which is provided with a hole for the passage of a stem with a piston, said jacket, said bottom and said piston forming the gas expansion and compression chamber, said gas cylinder actuator being characterized in that said head portion comprises an annular body, which is fixed internally to said jacket, and is provided with a central hole for the passage of said stem with the interposition of dynamic sealing means, static sealing means being interposed between said annular body and said jacket and an element for controlling the descending motion of a slider of a press with which the actuator is associated being provided and protruding from said annular body or from said jacket, said control element being preset to selectively move or break or deform in order to break or deform or render ineffective in general said static and dynamic sealing means.

BRIEF DESCRIPTION OF THE DRAWINGS

Further characteristics and advantages of the invention will become more apparent from the description of seven preferred but not exclusive embodiments of the gas cylinder actuator with overtravel safety device according to the invention, illustrated by way of non-limiting example in the accompanying drawings, wherein:

FIG. 1 is a sectional side view of a gas cylinder actuator according to the invention in a first embodiment thereof;

FIG. 2 is a view of a detail of FIG. 1;

FIG. 15 is a view of the same detail as in FIG. 14 in an overtravel situation;

FIG. 16 is a sectional side view of a gas cylinder actuator according to the invention in a fifth embodiment thereof;

FIG. 17 is a view of a detail of FIG. 16;

DESCRIPTION OF THE PREFERRED EMBODIMENTS

Figure 3:
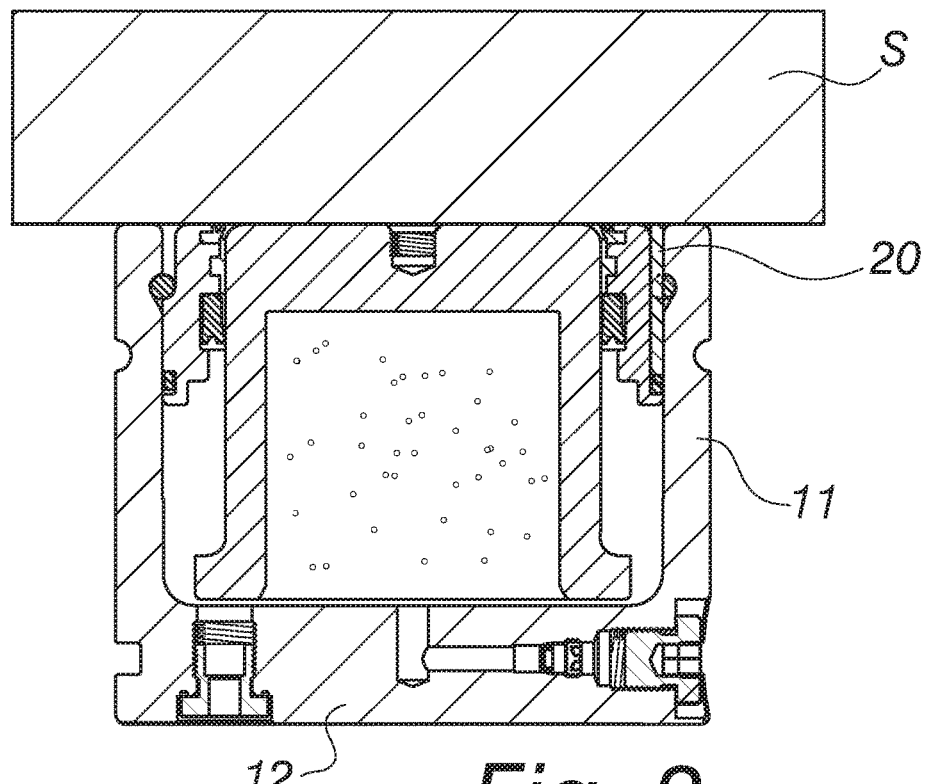
FIG. 3 is a view of the actuator of FIGS. 1 and 2 in an overtravel situation.

With reference to the figures, a gas cylinder actuator with overtravel safety device according to the invention is designated, in its first embodiment, shown in FIGS. 1 to 5, by the numeral 10.

The gas cylinder actuator 10 comprises a tubular jacket 11 for gas containment, which is closed hermetically at one end by a bottom 12 provided with a gas filling valve 13 and at the opposite end by a head portion 14, which is provided with a hole for the passage of a stem 15 with a piston 16.

The jacket 11, the bottom 12 and the piston 16 form the chamber 17 for compression and expansion of the gas.

The head portion 14 comprises an annular body 18, which is fixed inside the jacket 11, with a central hole 19 for the passage of the stem 15 with the interposition of dynamic sealing means 21, described in more detail hereinafter.

Static sealing means 22, also described in more detail hereinafter, are interposed between the annular body 18 and the jacket 11.

An element 20 for controlling the descending motion of a slider S of a press with which the gas cylinder actuator 10 is associated protrudes from the annular body 18.

The control element 20 is designed to move toward the inside of the gas cylinder actuator 10, under the thrust of the slider S, in order to render the static sealing means 22 ineffective.

In this first embodiment of the gas cylinder actuator according to the invention 10, the dynamic sealing means 21 are constituted for example by a stem scraping ring 23, a gasket 25 and a stem guiding band 24, each accommodated within a corresponding annular slot 26, 27 and 28.

The static sealing means 22 are constituted, again by way of non-limiting example of the invention, by an annular static gasket 29.

The static gasket 29 is arranged in a corresponding annular slot 30.

In this first embodiment of the gas cylinder actuator 10 according to the invention, the control element 20 is constituted by a rod, which has a conical or partially conical tip and is arranged in a complementarily shaped seat 31 that is formed between the annular body 18 and the jacket 11 so as to protrude in the direction of the axis of the stem 15.

The seat 31 extends in the direction of the main axis of the gas cylinder actuator 10 to the vicinity of the slot 30 for the static gasket 29.

Figure 4:
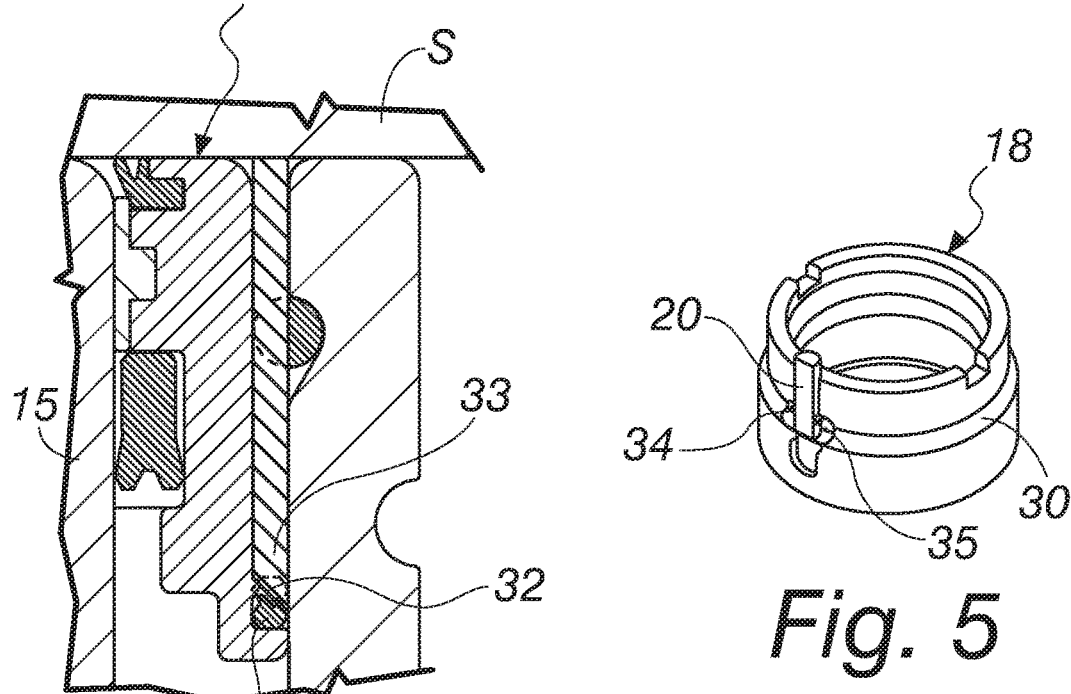
FIG. 4 is a view of a detail of FIG. 3.

The seat 31 and the slot 30 are separated by a lightened partition 32, which is designed to be perforated by the tip 33 of the control element 20 when the latter is pushed downward by an improper descent of the slider S, as shown by way of example in FIGS. 3 and 4.

The detail of FIG. 4 clearly shows that the tip 33 pierces the partition 32, which in turn is pushed against the static gasket 29.

The static gasket 29 is thus pushed from its precise static sealing position or damaged, producing an escape path for the gas in overpressure within the chamber 17.

In a variation of the first embodiment, the lightened partition 32 is absent and the tip 33 operates directly on the static gasket 29.

Figure 24:
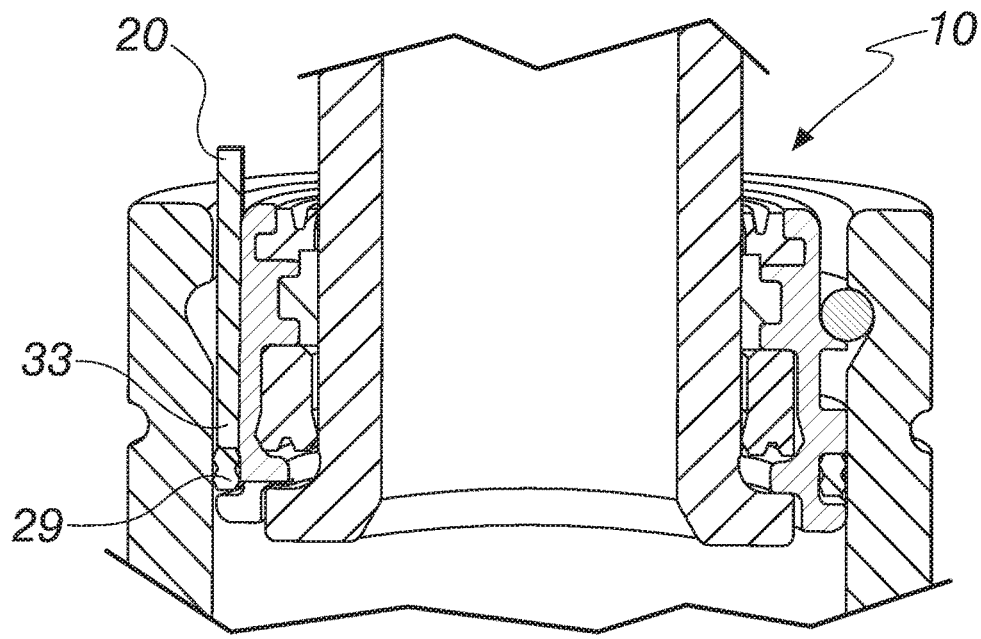
FIGS. 24 and 25 are sectional and perspective views of a gas cylinder actuator according to the invention in a variation of the first embodiment.
Figure 25:
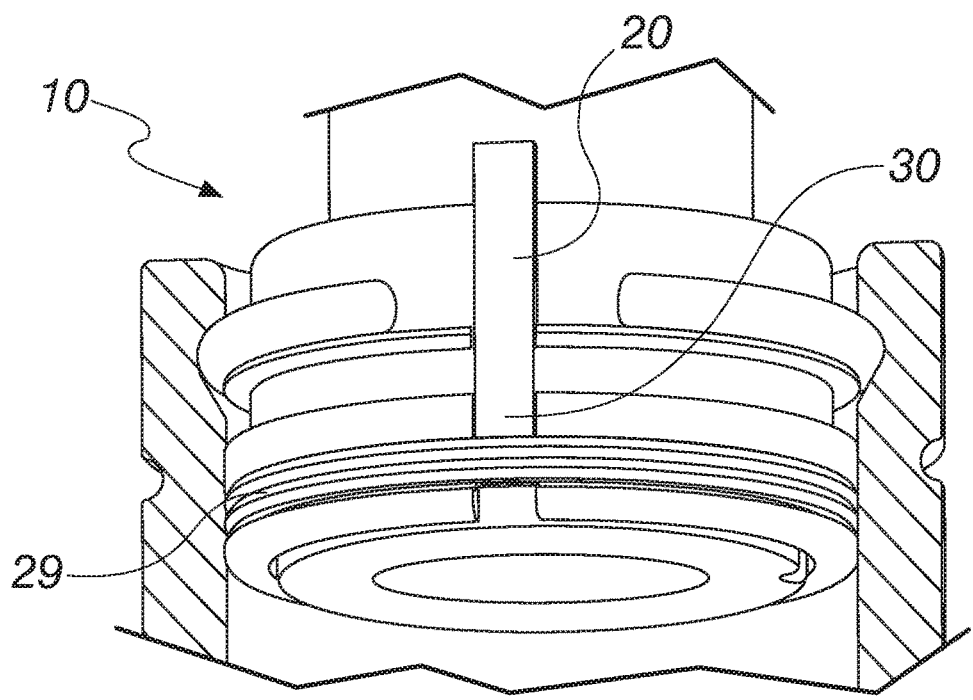

This variation is shown in FIGS. 24 and 25.

Figure 5:
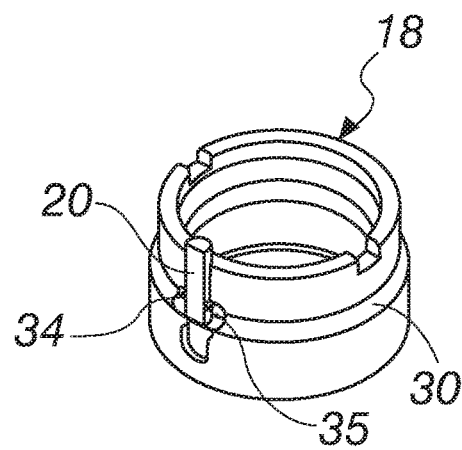
FIG. 5 is a perspective view of some components of the gas cylinder actuator according to the invention in its first embodiment.

In FIG. 5, the control element 20 has two lateral protrusions 34 and 35 designed to engage the slot 30 of the static gasket 29 during the descending motion of the control element 20; the lateral protrusions 34 and 35, once they are inside the slot 30, prevent the upward return of the control element 20 subjected to the thrust of the pressurized gas.

The prevention of return allows the uninterrupted discharge of the gas from the chamber 17.

The annular body 18 is coupled to the jacket 11 by means of an extraction-preventing metal ring 40.

Figure 6:
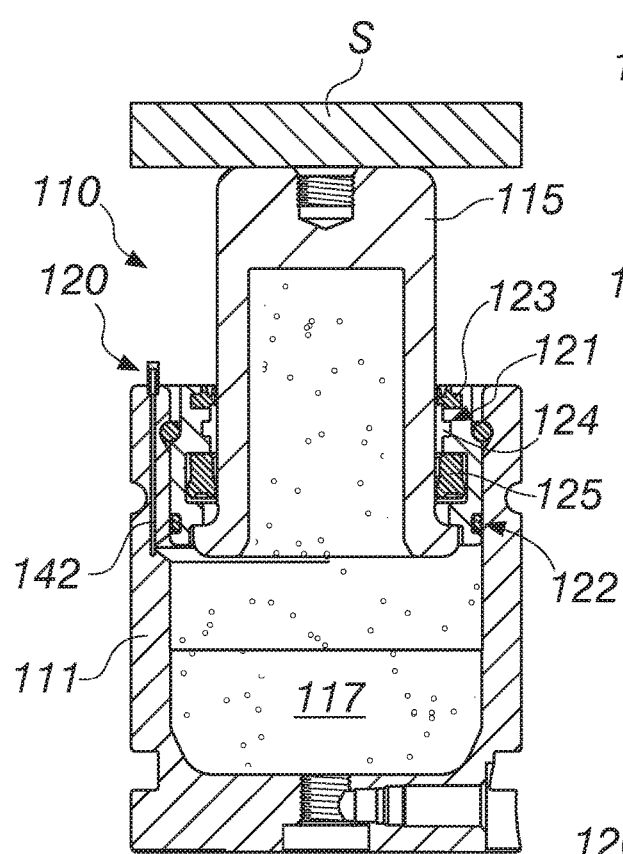
FIG. 6 is a sectional side view of a gas cylinder actuator according to the invention in a second embodiment thereof.
Figure 7:
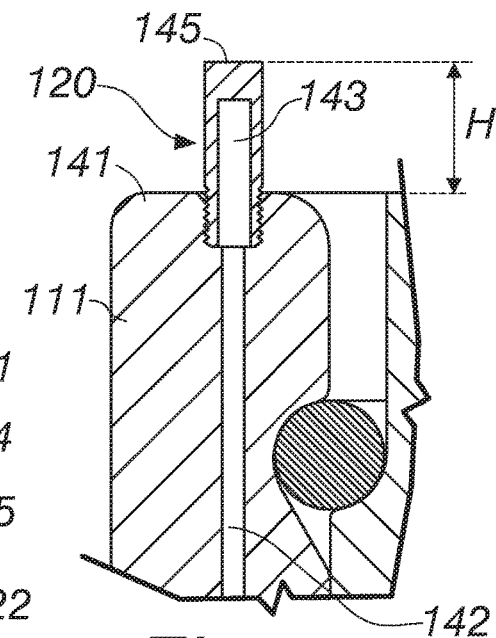
FIG. 7 is a view of a detail of FIG. 6.
Figure 8:
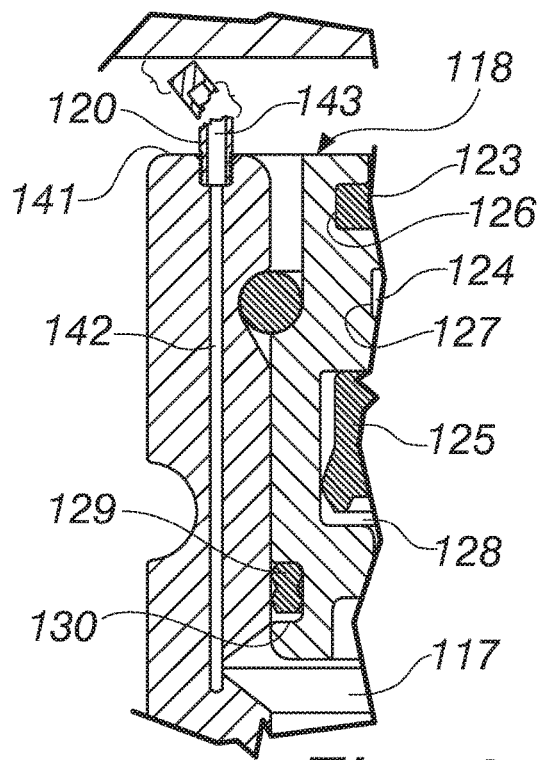
FIG. 8 is a view of the same detail of FIG. 7 in an overtravel situation.
Figure 9:
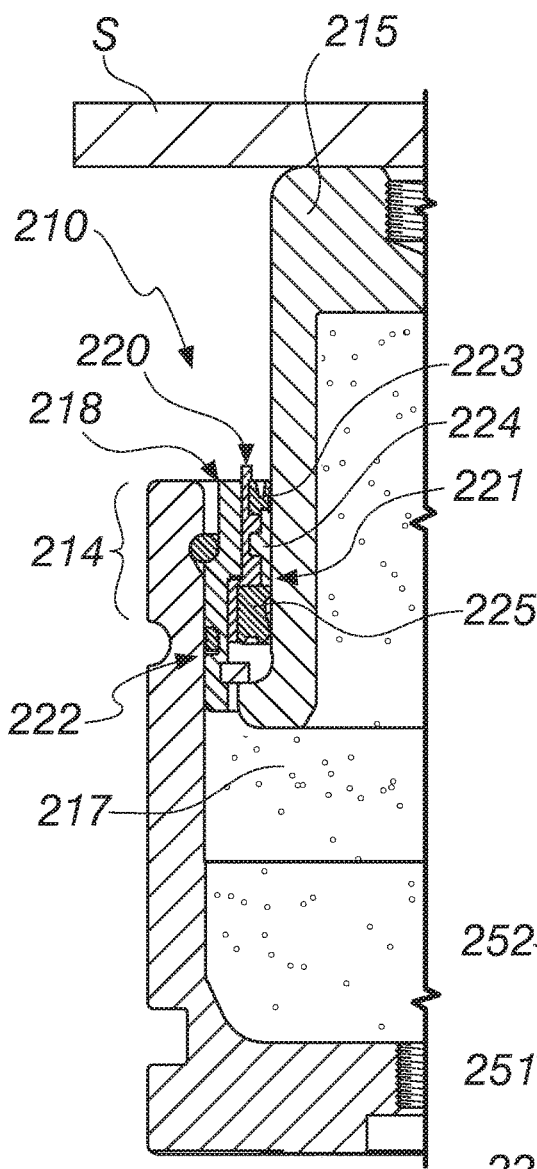
FIG. 9 is a sectional side view of a portion of a gas cylinder actuator according to the invention in a third embodiment thereof.
Figure 10:
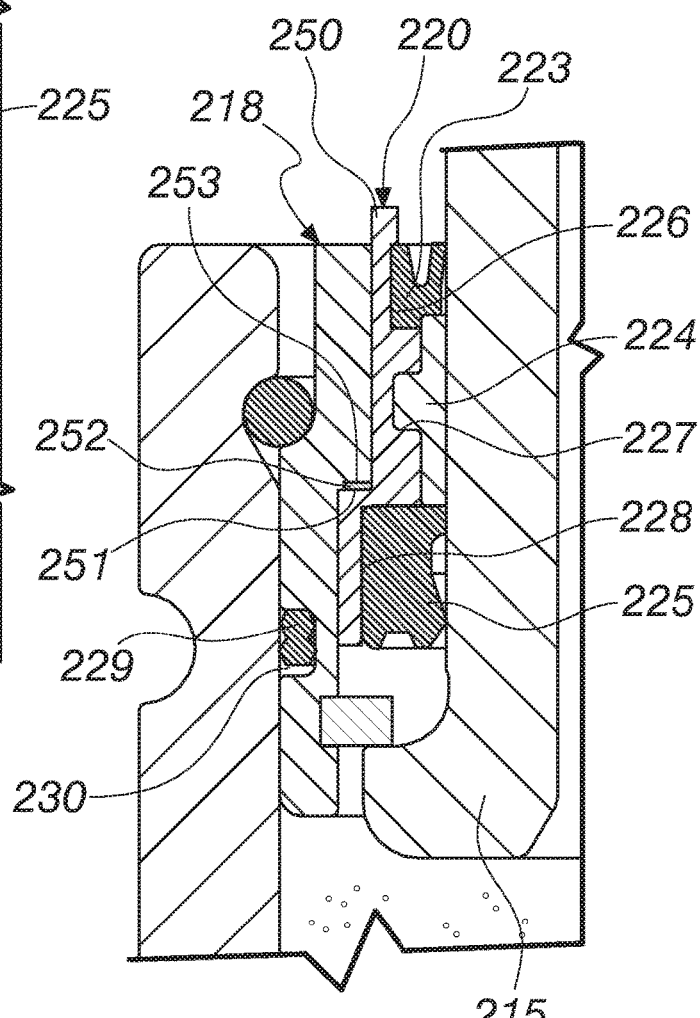
FIG. 10 is a view of a detail of FIG. 9.

FIGS. 6 to 8 illustrate a second embodiment of a gas cylinder actuator according to the invention, generally designated by the reference numeral 110.

In this second embodiment of the gas cylinder actuator according to the invention 110, the dynamic sealing means 121 are constituted for example by a stem scraper ring 123, by a gasket 125 and by a stem guiding band 124, each accommodated within a corresponding annular slot 126, 127 and 128.

The static sealing means 122 are constituted, again by way of non-limiting example of the invention, by an elastic ring 129, which is arranged within a corresponding annular slot 130.

In this second embodiment of the gas cylinder actuator 110 according to the invention, the control element 120 is constituted by a plug that is screwed onto the face 141 of the jacket 111 that is directed toward the slider S; the control element 120 blocks a safety discharge hole 142 that is formed in the jacket 111 and connects the chamber 117 to the outside.

The control element 120 has a cavity 143 that extends in the direction of the main axis of the plug.

The cavity 143 is constituted substantially by a dead hole that terminates in the head 145 of the plug.

The control element 120, once it is installed on the jacket 111, extends toward the overlying slider S.

The height H by which the control element 120 protrudes from the jacket 111 is such as to affect indeed the slider S in its descending motion before it causes the retraction of the piston stem 115 within the chamber 117 beyond design limits.

The cavity 143 has the purpose of facilitating the breakage of the control element 120 when it is struck by the descending slider S and at the same time it has the purpose of making the breakage, as shown in FIG. 8, connect the safety discharge hole 142 to the outside.

The discharge element 120 is designed of course to withstand the pressure of the gas that is present within the chamber 117.

FIGS. 9 to 12 illustrate a third embodiment of a gas cylinder actuator according to the invention, designated therein by the reference numeral 210.

In such third embodiment of the gas cylinder actuator according to the invention 210, the dynamic sealing means 221 are constituted for example by a stem scraper ring 223, by a gasket 225 and by a stem guiding band 224, each accommodated in a corresponding annular slot 226, 227 and 228.

The static sealing means 222 are constituted, again by way of non-limiting example of the invention, by an elastic ring 229 arranged in a corresponding annular slot 230.

In this third embodiment of the gas cylinder actuator 210 according to the invention, the control element 220 is constituted by a shaped bushing, which is interposed between the piston stem 215 and the annular body 218 of the head portion 214 of the gas cylinder actuator 210.

The shaped bushing has an end portion 250 that protrudes in the direction of the main axis of the gas cylinder actuator 210 toward an overlying slider S of which an excessive descending motion is to be controlled.

The control element 220 is free to slide between the annular body 218 and the piston stem 215 toward the inside of the gas cylinder actuator 20.

The control element 220 has a first shoulder 251 for the resting and compression of a sealing ring 252, which is pressed between the first shoulder 251 and an opposite second shoulder 253 formed on the annular body 218.

Figure 11:
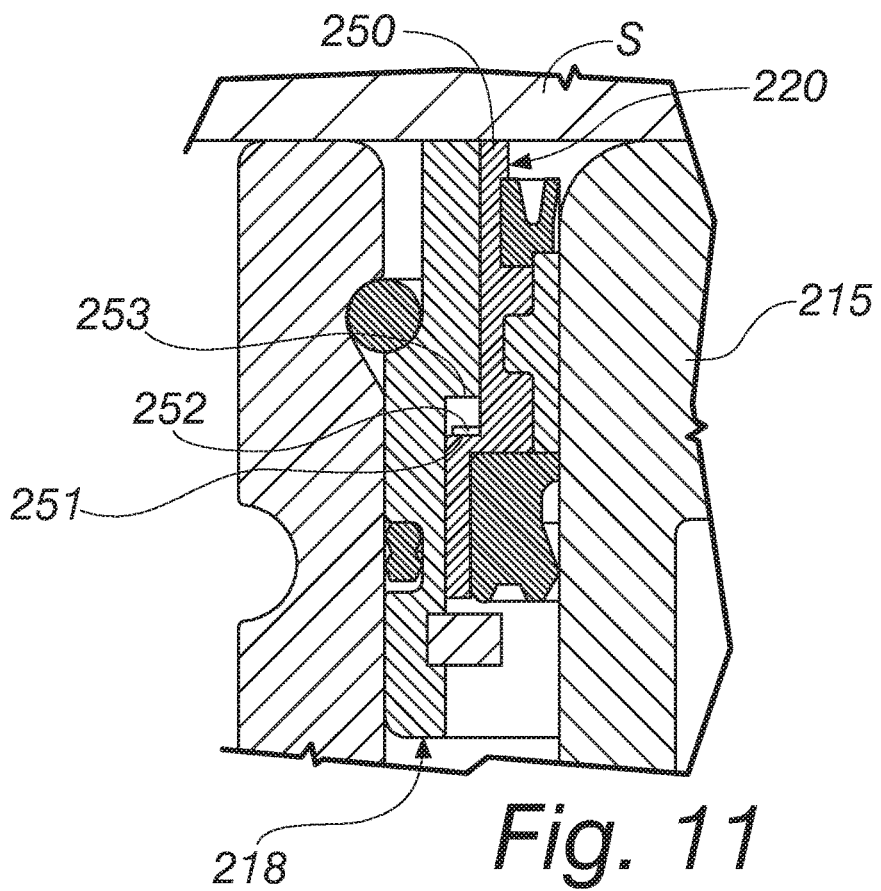
FIG. 11 is a view of the same detail as in FIG. 10 in an overtravel situation.

As shown in FIG. 11, when the slider S pushes the control element 220 toward the inside of the gas cylinder actuator 210, the first shoulder 251 moves downward and the sealing ring 252 is no longer compressed between the two shoulders, the first one 251 and the second one 253, with the consequence that the gas in overpressure inside the chamber 217 can find an escape path between the annular body 218 and the control element 220.

The sealing ring 252 is, for example, made of vulcanized rubber.

The control element 220 is made of metallic material or, as an alternative, of rigid plastic material.

In the present constructive example, the annular slots 226, 227 and 228 for the dynamic sealing means 221 are provided on the shaped bushing that forms the control element 220.

Figure 12:
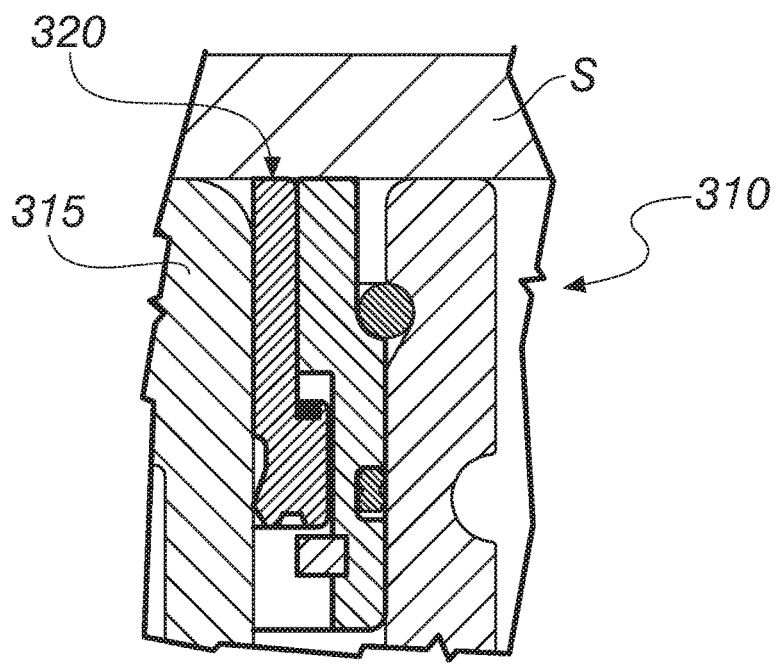
FIG. 12 is a view of a detail of a gas cylinder actuator according to the invention in a variation of the third embodiment.

FIG. 12 illustrates by way of example a variation of said third embodiment of the gas cylinder actuator according to the invention, designated therein by the reference numeral 310.

In this variation, the control element 320 is constituted by a shaped bushing that is also made of nonmetallic material suitable to apply a dynamic seal to the piston stem 315.

The control element 320 is, for example, made of suitable energized rigid plastic material.

Therefore, a stem scraper ring, a gasket and a stem guiding ring are not present as in the embodiments of the invention described above.

Figure 13:
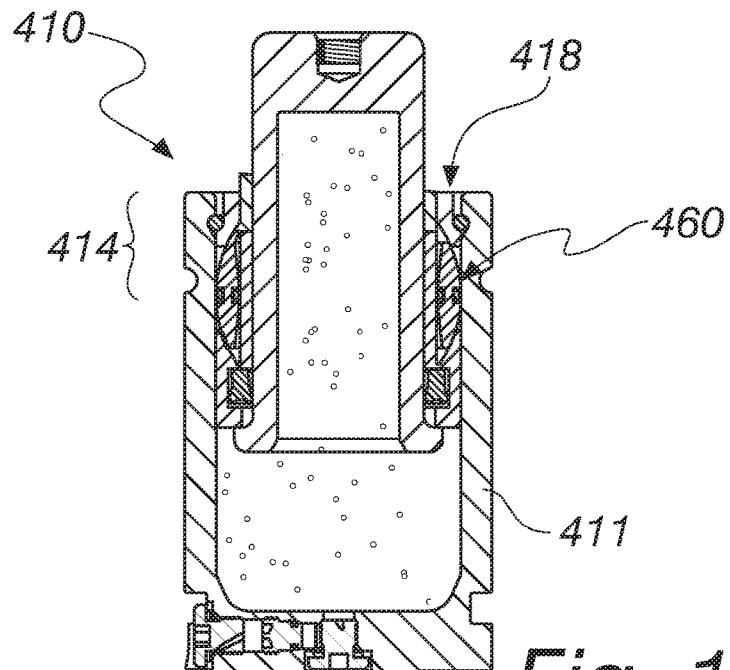
FIG. 13 is a sectional side view of a gas cylinder actuator according to the invention in a fourth embodiment thereof.
Figure 14:
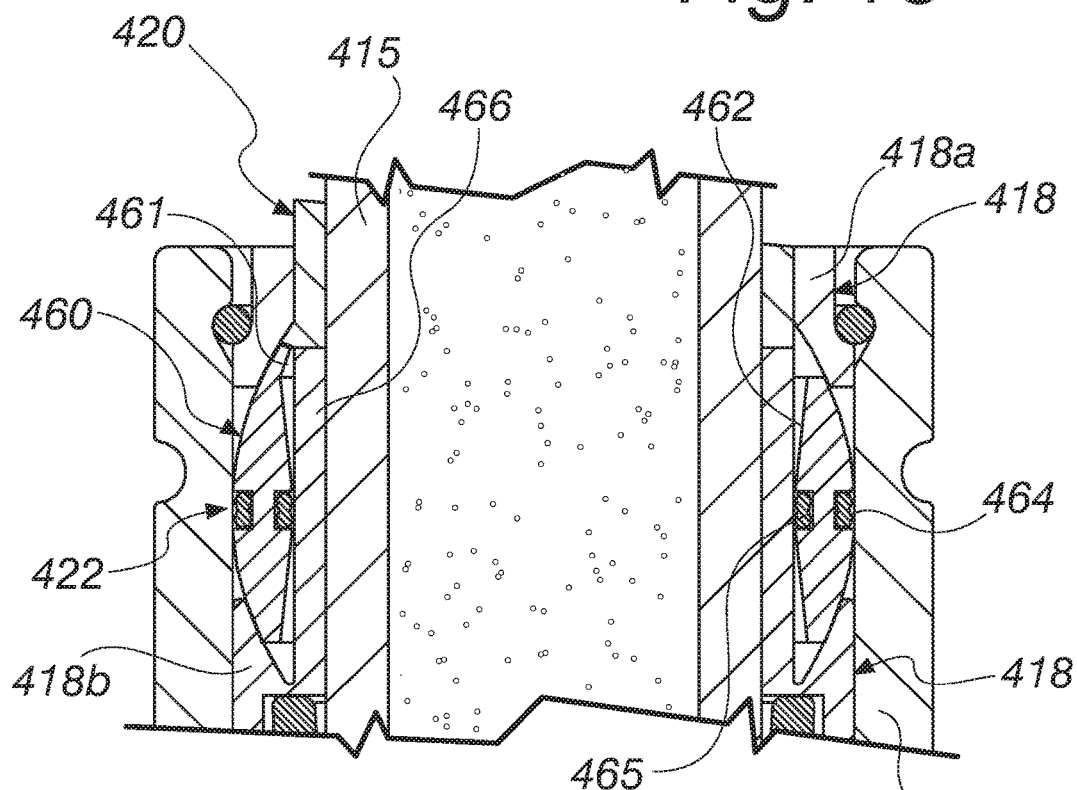
FIG. 14 is a view of a detail of FIG. 13.
Figure 18:
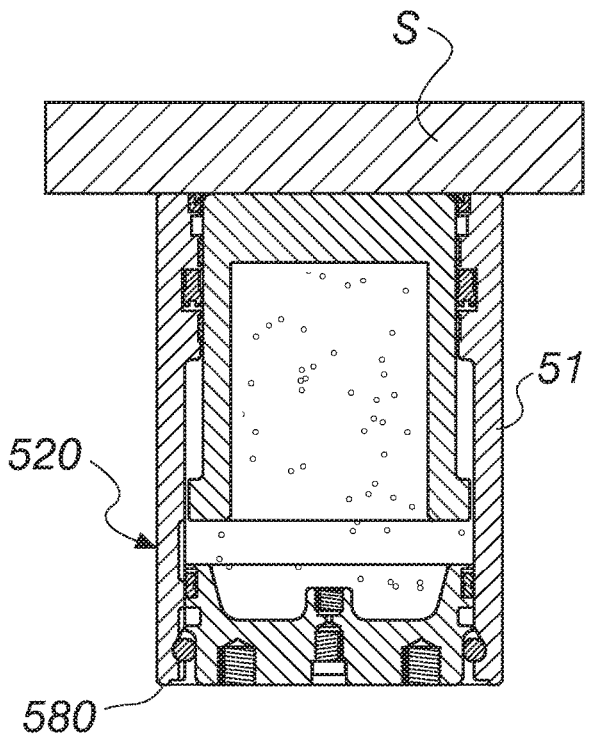
FIG. 18 is a sectional side view of the gas cylinder actuator of FIG. 16 in an overtravel situation.

FIGS. 13 to 15 illustrate a gas cylinder actuator according to the invention in a fourth embodiment, designated therein by the reference numeral 410.

In the gas cylinder actuator 410, the annular body 418 comprises a first upper part 418a and a second lower part 418b that are shaped to accommodate an annular oscillating body 460 that is shaped externally like a spherical segment.

At least one point of the upper edge 461 of the annular oscillating body 460 is in contact with a control element 420, which is contoured so as to protrude at an angle from the head portion 414 so as to affect the slider S in case of improper descent of the latter.

The internal surface 462 of the annular oscillating body 460 also has an arc-like cross-section that is convex toward the main axis of the gas cylinder actuator.

The static sealing means 422 are constituted by two sealing rings, a first outer one 464 and a second inner one 465, the first one normally in contact with the internal surface of the jacket 411, the second one normally in contact with the outer surface of the internal portion 466 of the second lower part 418b of the annular body 418.

The overtravel descent of the slider S causes the compression of the control element 420, which pushes in a limited region the annular oscillating body 460; said body tilts due to the geometry of its outer surface and of its inner surface, eliminating the sealing effect of the external static sealing ring 464 and the internal static sealing ring 465, as shown in FIG. 15.

The control element 420 is made of high-density polyurethane and when it is compressed by the slider S it deforms and enters the interstices that are provided between the piston stem 415 and the parts 418a and 418b of the annular body 418.

The disengagement of the static sealing rings 464 and 465 causes the outflow of the gas in overpressure and the protection of the gas cylinder actuator 410.

FIGS. 16 to 21 are views of a gas cylinder actuator according to the invention in a fifth embodiment, designated therein by the reference numeral 510.

The gas cylinder actuator 510, with overtravel safety device, comprises a tubular jacket 511 for gas containment, which is closed hermetically at one end by a bottom 512 provided with a gas filling valve 513 and, at the opposite end, by a head portion 514 which is provided with a hole for the passage of a stem 515 with a piston 516, said jacket, said bottom and said piston forming the compression and expansion chamber of the gas 517.

The particularity of said gas cylinder actuator 510 resides in the fact that the static sealing means are located between the bottom 512 and the internal surface 570 of the jacket 511 that surrounds the bottom 512.

Such static sealing means are constituted by a sealing ring 571 that is accommodated in a corresponding annular slot 572 that is formed perimetrically to the bottom 512.

The fixing of the bottom 512 to the lower part of the jacket 511 is provided by means of a locking ring 573 that is partly inserted in a first slot 574 provided in the internal surface of the jacket 511 and partly rested against a corresponding shoulder 575 provided on the outside of the bottom 512, said extraction-preventing shoulder 575 being adapted to retain the bottom 512 inside the jacket 511 when the gas cylinder actuator is loaded and is therefore operating.

Proximate to the shoulder 575, at the end opposite to the locking ring 573 in an axial direction, there is a lightening slot 577 that is adapted to make the shoulder 575 breakable.

The lower edge 580 of the jacket 511, which is in resting contact, has a reduced cross-section, so that it is able to deform in a controlled manner if subjected to a load by the slider S.

In this fifth embodiment of the gas cylinder actuator according to the invention 510, the control element 520 is the jacket 511 itself.

When the slider S exceeds in the descent travel, it strikes the jacket 511, which deforms elastically by compression of its lower edge 580 that is in resting contact, while the bottom 512 remains in its original position.

The deformation by compression of the lower edge 580 entails the movement of the jacket 511, and therefore of its internal surface 570, with respect to the bottom 512.

Figure 19:
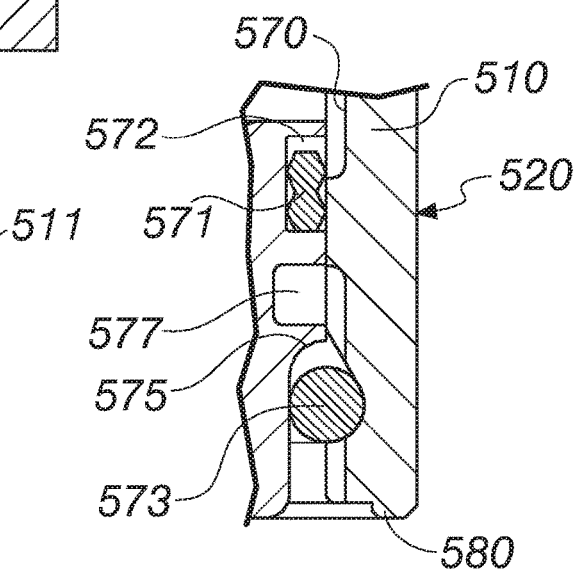
FIG. 19 is a view of a detail of FIG. 18.

This movement causes, as shown in FIG. 19, the at least partial separation of the sealing ring 571 from the internal surface 570 of the jacket 511, with consequent generation of an escape path for the gas in overpressure inside the gas cylinder actuator 510.

The fifth embodiment of the gas cylinder actuator 510 according to the invention also has an additional safety system in case of what is called an uncontrolled return situation, i.e., with the stem pushed upward abnormally.

Figure 20:
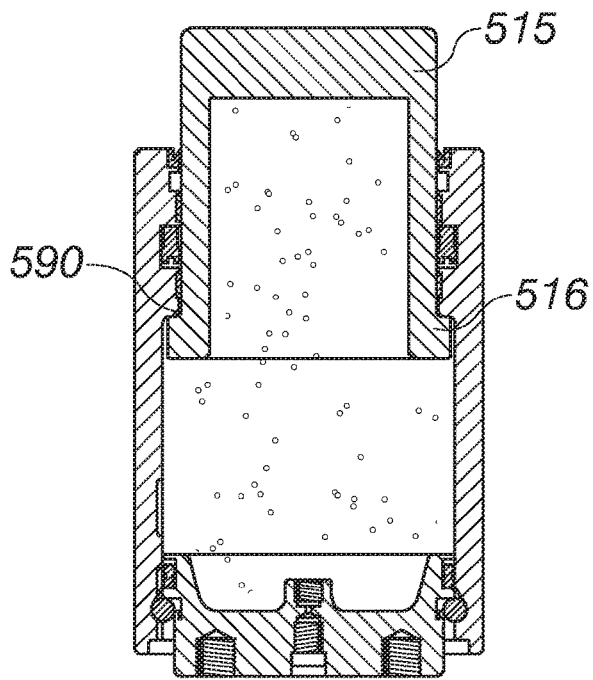
FIG. 20 is a view of the gas cylinder actuator of FIG. 16 in a different critical situation.
Figure 21:
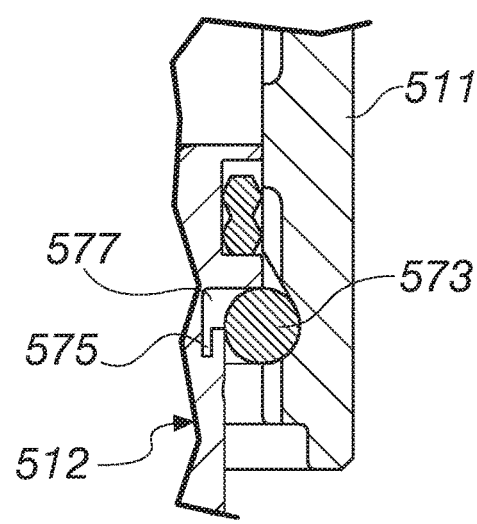
FIG. 21 is a view of a detail of FIG. 20.

If the shoulder of the piston 516 of the stem 515 strikes the corresponding extraction-preventing abutment 590 inside the jacket 511 due to an excessively fast ascending motion, this would cause, as shown in FIGS. 20 and 21, the failure of the shoulder 575 for retaining the locking ring 573, with consequent lifting of the jacket 511 with respect to the bottom 512 and at least partial separation of the sealing ring 571 from the internal surface 570 of the jacket 511, with consequent generation of an escape path for the overpressure gas inside the gas cylinder actuator 510.

Figure 22:
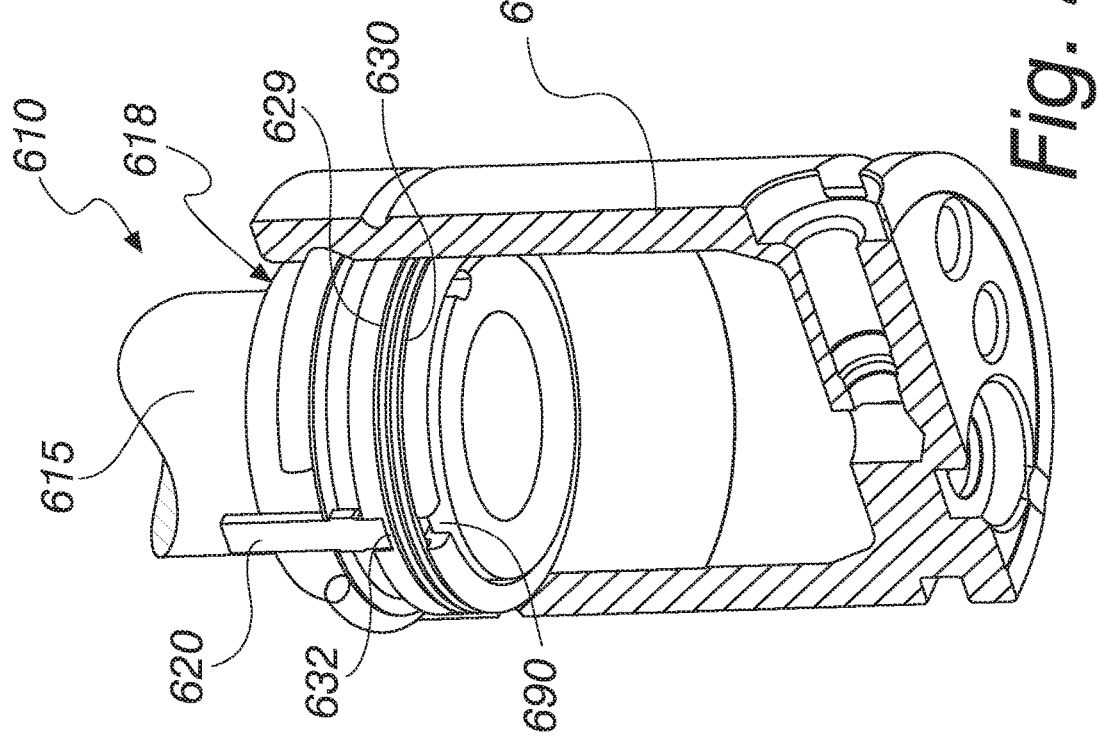
FIG. 22 is a perspective cutout view of a gas cylinder actuator according to the invention in a sixth embodiment.

FIG. 22 is a perspective cutout view of a gas cylinder actuator according to the invention in a sixth embodiment, designated therein by the numeral 610.

In said sixth embodiment, the control element 620 is constituted by a pointed rod arranged in a complementarily shaped seat that is formed between the annular body 618 and the jacket 611 so as to protrude in the direction of the axis of the stem 615.

Said seat extends in the direction of the main axis of the gas cylinder actuator 610 to the vicinity of the slot 630 for the static gasket 629.

The seat and the slot 630 are separated by a lightened partition 632, designed to be pierced by the point of the control element 620 when it is pushed downward by an improper descent of the slider S.

In this embodiment, below the gasket 629, at the lightened partition 632 and on the opposite side with respect to the latter relative to the gasket 629, there is, in the annular body 618, an opening 690 of the slot 630, which is directed downward and is adapted to speed up and amplify the disengagement of the gasket 629 when it is subjected to the operation of the control element 620.

The gasket 629, pushed downward by the control element 620 in its descent travel, in fact deforms and enters, with one of its portions, the opening 690, deforming more than in the absence of the opening 690, thus creating a larger escape path for the pressurized gas.

Figure 23:
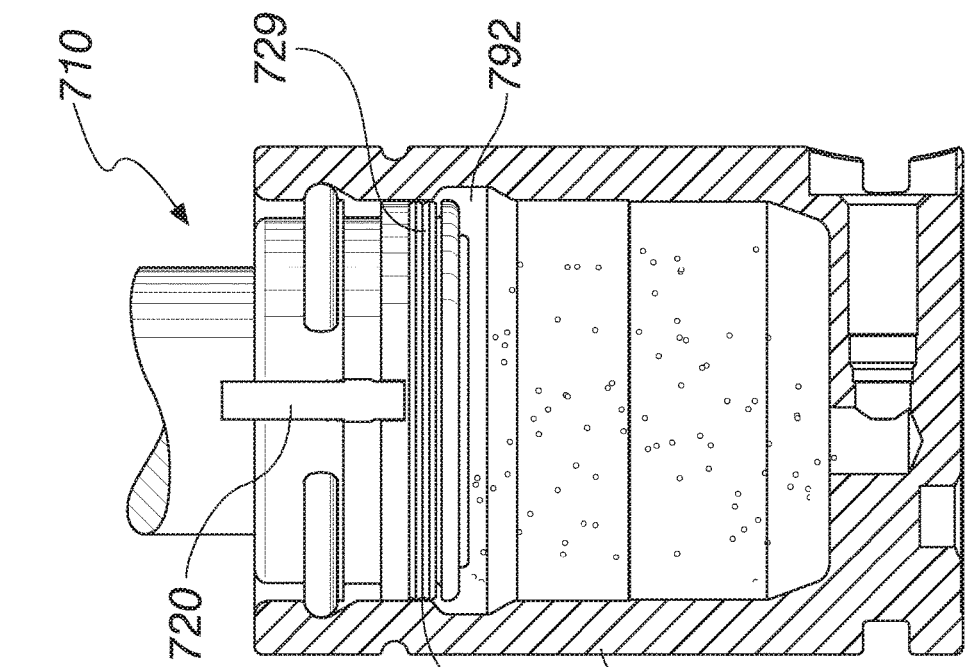
FIG. 23 is a sectional side view of a gas cylinder actuator according to the invention in a seventh embodiment.

FIG. 23 illustrates a gas cylinder actuator according to the invention in a seventh embodiment, designated therein by the reference numeral 710.

In this embodiment, below the internal surface band 791 of the jacket 711 against which the gasket 729 is pressed when the gas cylinder actuator is operating there is a perimetric low-relief 792, for example a groove.

The perimetric low-relief 792 facilitates the separation of the gasket 729 from the internal surface 791 when the control element 720 becomes active and pushes the gasket 729 downward.

In practice it has been found that the invention achieves the intended aim and objects.

In particular, the invention provides a gas cylinder actuator with overtravel safety device that is simple to reset if overtravel occurs; if the control element is intact, it is in fact sufficient to replace the gasket that has been ruined by it, or if the control element has been deformed permanently or broken it is sufficient to replace it, these operations being in any case quick and cheap.

Furthermore, the invention provides a gas cylinder actuator in which the activation of the safety device is easily visible also from the outside of said gas cylinder actuator, such as for example in the case of the first embodiment described above, in which the control element 20 has lateral protrusions 34 and 35, which, once they are in the slot 30, prevent the upward return of the control element 20 subjected to the thrust of the pressurized gas and accordingly once the control element 20 has been pushed into the jacket 11 it does not exit from it, disappearing from sight and providing a clear visual indicator that overtravel has occurred.

Moreover, the gas cylinder actuator according to the invention, if the associated press or associated mold or other equipment to which the gas cylinder actuator 10 is applied were to strike the actuator itself, causing breakages therein such as to allow the ejection of the piston stem, said piston stem would be already subjected, when such breakages occur, to a relatively weak thrust of the gas thanks to the fact that the gas in overpressure in the meantime has bled through the escape paths produced by the intervening lack of tightness of the sealing means.

Moreover, the present invention provides a gas cylinder actuator with safety device that is not less efficient and safe than known gas cylinder actuators.

Last but not least, the invention provides a gas cylinder actuator with overtravel safety device that is structurally simple and easy to use and can be manufactured with known systems and technologies and at low cost.

The invention thus conceived is susceptible of numerous modifications and variations, all of which are within the scope of the appended claims; all the details may further be replaced with other technically equivalent elements.

In practice, the materials used, as well as the contingent shapes and dimensions, may be any according to the requirements and the state of the art.

The disclosures in Italian Patent Applications No. PD2012A000057 and PD2012A000194 from which this application claims priority are incorporated herein by reference.

What is claimed is:

1. A gas cylinder actuator with overtravel safety device, comprising a tubular jacket for gas containment, which is closed hermetically at one end by a bottom provided with a gas filling valve and at the opposite end by a head portion, which is provided with a hole for a passage of a stem with a piston, said jacket, said bottom and said piston forming a gas expansion and compression chamber, wherein said head portion comprises an annular body, which is fixed internally to said jacket, and is provided with a central hole for the passage of said stem with the interposition of dynamic sealing means, static sealing means being interposed between said annular body and said jacket and a control element for controlling the descending motion of a slider of a press with which the actuator is associated being provided and protruding from said annular body or from said jacket, said control element being preset to selectively move or break or deform in order to break or deform or render ineffective in general said static and dynamic sealing means, wherein said control element is constituted by a shaped bushing, which is interposed between the piston stem and the annular body of the head portion of the gas cylinder actuator, said shaped bushing having an end portion which protrudes in the direction of a main axis of the gas cylinder actuator toward an overlying slider, said control element being free to slide between the annular body and the piston stem toward an inside of the gas cylinder actuator, said control element having a first resting and compression shoulder for a sealing ring which is designed to be pressed between said first shoulder and an opposite second shoulder formed on the annular body.

2. The gas cylinder actuator according to claim 1, wherein annular slots for dynamic sealing means are provided in said shaped bushing that forms the control element.

3. A gas cylinder actuator with overtravel safety device, comprising a tubular jacket for gas containment, which is closed hermetically at one end by a bottom provided with a gas filling valve and at the opposite end by a head portion, which is provided with a hole for a passage of a stem with a piston, said jacket, said bottom and said piston forming a gas expansion and compression chamber, wherein said head portion comprises an annular body, which is fixed internally to said jacket, and is provided with a central hole for the passage of said stem with the interposition of dynamic sealing means, static sealing means being interposed between said annular body and said jacket and a control element for controlling the descending motion of a slider of a press with which the actuator is associated being provided and protruding from said annular body or from said jacket, said control element being preset to selectively move in order to break or deform said static and dynamic sealing means, wherein the control element is constituted by a shaped bushing which is made of a nonmetallic material adapted to provide a dynamic seal on the piston stem.

* * * * *